3,538,019
NICKEL PHOSPHATE-PROMOTED SUPPORTED
NICKEL CATALYST
Robert J. Capik and Leon W. Wright, Wilmington, Del., assignors to Atlas Chemical Industries, Inc., Wilmington, Del., a corporation of Delaware
No Drawing. Filed Mar. 7, 1968, Ser. No. 711,212
Int. Cl. B01j *11/74*
U.S. Cl. 252—437  5 Claims

ABSTRACT OF THE DISCLOSURE

Catalysts which comprise finely divided metallic nickel and finely divided nickel phosphate supported on an inert carrier wherein the total nickel is from 12 to 45% by weight, based on total weight of catalyst, the phosphate ($PO_4$) content is from 0.6% to 23% by weight, based on the total weight of catalyst, and the ratio of total nickel to phosphorus is greater than 2.84. The catalysts are useful for the production of polyhydric alcohols from carbohydrates.

---

This invention relates to improved catalysts and to methods for the production of such catalysts. This invention further relates to an improved process for the production of polyhydric alcohols from carbohydrates. More particularly, this invention relates to nickel phosphate promoted supported nickel catalysts which are useful for the production of polyhydric alcohols by the simultaneous hydrolysis and hydrogenation of carbohydrates.

The term "carbohydrates" as used throughout the specification and appended claims includes monosaccharides and polysaccharides.

The term "polysaccharide" as used throughout the specification and appended claims includes those saccharides containing more than one monosaccharide unit.

A wide variety of catalysts have been proposed for the hydrogenation of monosaccharides, such as glucose and fructose, to polyhydric alcohols. The catalysts most often used for this purpose are the Raney nickel catalysts, such as those described in J.A.C.S., 54, pages 4116–4117, (1932) and U.S. Pat. No. 2,983,734, and finely divided supported nickel catalysts, such as those disclosed in U.S. Pat. No. 2,749,371. These hydrogenation catalysts, however, have not been entirely satisfactory as they exhibit low activity and low surface area and produce low yields of the desired polyhydric alcohol. Furthermore, the finely divided supported nickel catalysts are deactivated during a single usage in a typical hydrogenation reaction. Another serious disadvantage of these catalysts is that they are not effective for the preparation of polyhydric alcohols directly from polysaccharides. Various catalysts have been proposed for the simultaneous hydrolysis and hydrogenation of polysaccharides to polyhydric alcohols. Examples of these catalysts are disclosed in U.S. Pat. No. 2,518,235. These catalysts also suffer from the disadvantage that they exhibit low activity and are deactivated during a single usage in a typical hydrogenation reaction. Accordingly, there is a great need in the art for a catalyst which would be used for the production of polyhydric alcohols from monosaccharides and polysaccharides and which would overcome the aforementioned disadvantages.

It is an object of this invention to provide a novel catalyst. It is another object of this invention to provide a catalyst which would overcome the aforementioned disadvantages of the prior art catalysts. It is another object of this invention to provide a catalyst for the production of polyhydric alcohols from carbohydrates. It is another object of this invention to provide a catalyst for the simultaneous hydrolysis and hydrogenation of carbohydrates to polyhydric alcohols. It is a further object of this invention to provide a catalyst having high activity. It is another object of this invention to provide a catalyst having an increased surface area. It is another object of this invention to provide a catalyst which has increased stability, thereby allowing reuse of the catalyst without reactivation. It is another object of this invention to provide a catalyst which is highly effective for the production of polyhydric alcohols directly from polysaccharides. It is another object of this invention to provide a catalyst which gives high yields of the desired polyhydric alcohols. It is a further object of this invention to provide a process for the production of such catalyst. It is a further object of this invention to provide an improved process for the preparation of polyhydric alcohols from carbohydrates.

The foregoing objects and still further objects are accomplished according to the present invention by providing catalysts which comprise finely divided metallic nickel and finely divided nickel phosphate supported on an inert carrier wherein the amounts of metallic nickel, nickel phosphate, and inert carrier present in the catalyst are such that the total nickel content, that is metallic nickel plus combined nickel, is from 12% to 45% by weight, based on the total weight of catalyst, the phosphate ($PO_4$) content is from 0.6% to 23% by weight, based on the total weight of catalyst, and the weight ratio of total nickel to phosphorus is greater than 2.84. In order to achieve the objects and advantages of this invention it is essential that the catalysts contain amounts of metallic nickel, nickel phosphate and carrier to furnish a total nickel content, a phosphate ($PO_4$) content, and a ratio of total nickel to phosphorus within the ranges defined above.

The inert carrier on which the finely divided metallic nickel and finely divided nickel phosphate are deposited may be any of the inert materials used heretofore for supporting hydrogenation catalysts. Illustrative examples of such inert carriers or supports are diatomaceous earth, finely divided silica, kieselguhr, and activated carbon. The preferred carriers are diatomaecous earth and activated carbon.

The catalysts of this invention may also contain small amounts of finely divided iron supported on the inert carrier. It has been found that small amounts of iron increase the activity of the catalyst. The amount of iron present in the catalyst may be up to 2.5%, preferably 0.1% to 2.0%, by weight, based on the total weight of catalyst. The activity of the catalyst may be even further increased by the presence of up to 2.0% by weight, based on the total weight of catalyst, of finely divided chromium, cerium, and copper.

The preferred catalysts of this invention comprise finely divided metallic nickel, iron, and nickel phosphate supported on an inert carrier wherein the total nickel content is from 15% to 30% by weight, based on the total weight of catalyst, the phosphate ($PO_4$) content is from 1% to 14% by weight, based on the total weight, of catalyst, the iron content is from 0.1% to 2.0% by weight, based on the total weight of catalyst, and the weight ratio of total nickel to phosphorus is greater than 3.28.

The catalysts of this invention have an activity from two to four times as high as the activity of a supported nickel catalyst which contains no nickel phosphate. In order to illustrate the increased activity of the catalysts of this invention, catalysts containing various amounts of nickel phosphate were used in the hydrogenation of glucose in essentially neutral, 50 percent by weight aqueous solution at 140° C. and under a hydrogen pressure of 1500 p.s.i., with sufficient catalyst to furnish 1.0% by weight of total nickel based on the weight of glucose. As the hydrogenation of glucose is a pseudo first order reaction, the activity or rate constant is given by the well-known first-order reaction equation:

$$\ln \frac{C_o}{C} = kt$$

wherein $k$ is the reaction rate constant, $C_o$ is the initial sugar concentration, and $C$ is the sugar concentration after elapsed time $t$. The results are shown in Table I.

TABLE I

| Catalyst No. | Weight percent (PO₄) | $k$ hours⁻¹ (reciprocal hours) |
| --- | --- | --- |
| 1 | 0.0 | 3.9 |
| 2 | 0.6 | 9.2 |
| 3 | 0.8 | 9.4 |
| 4 | 1.4 | 10.4 |
| 5 | 2.0 | 10.6 |
| 6 | 5.8 | 10.4 |
| 7 | 7.6 | 17.3 |
| 8 | 13.0 | 18.7 |
| 9 | 15.3 | 15.2 |

The catalysts of this invention are highly resistant to deactivation, thereby allowing reuse of the catalyst without reactivation. It has now been found that the catalysts of this invention may be used in six to eight consecutive hydrogenation runs before recativation is required. Supported nickel catalysts known prior to this invention, that is supported nickel catalysts which do not contain nickel phosphate, require reactivation after only one hydrogenation run. In order to illustrate the increased stability of the catalysts of this invention as compared to phosphate free supported nickel catalysts, glucose was hydrogenated at 140° C. with a phosphate free supported nickel catalyst and with a catalyst of this invention which has a phosphate (PO₄) content of 2.0% by weight. The phosphate free catalyst had an initial activity of 3.9 reciprocal hours and an activity of 0.7 reciprocal hour after only one hydrogenation run. The phosphate containing catalyst had an initial activity of 10.6 reciprocal hours, an activity of 8.3 reciprocal hours after three runs, and an activity of 5.8 reciprocal hours after five runs.

The catalysts of this invention may be prepared by forming a slurry of an inert carrier in an acidic, aqueous solution of nickel nitrate and nickel phosphate, neutralizing the slurry with an alkali metal carbonate to precipitate nickel carbonate, nickel hydroxide, and nickel phosphate on the inert carrier, and reducing the nickel carbonate and nickel hydroxide to metallic nickel. The aqueous solution of nickel nitrate and nickel phosphate may be prepared by adding phosphoric acid to an aqueous solution of nickel nitrate or by treating metallic nickel with nitric acid to form nickel nitrate and then adding phosphoric acid. Catalysts containing finely divided metallic iron, copper, chromium, or cerium are prepared by adding the nitrate of the metal to the aqueous solution of nickel nitrate and nickel phosphate prior to the addition of the alkali metal carbonate. A preferred method of preparing the catalysts of this invention comprises: forming a slurry of inert carrier in an acidic, aqueous solution of nickel nitrate and nickel phosphate; heating the slurry to 75 to 100° C.; adding alkali metal carbonate to the heated slurry to precipitate nickel carbonate, nickel hydroxide, and nickel phosphate onto the surface of the inert carrier, the nickel carbonate converting to nickel hydroxide due to the elevated temperature; and heating the catalyst to a temperature from 450° C. to 550° C. in the presence of hydrogen to reduce the nickel hydroxide to metallic nickel. The catalysts may also be prepared in situ by adding nickel phosphate to a feed solution containing the carbohydrate to be hydrogenated and a supported nickel catalyst which does not contain any phosphate.

It has now been discovered that the hydrogenation of monosaccharide and the simultaneous hydrolysis and hydrogenation of polysaccharides may be conducted in a practical and economical manner, substantially free of degradation and transformation reactions, and with an almost substantially complete conversion of the monosaccharide and polysaccharide to polyhydric alcohol, by the novel method of incorporating a catalyst of this invention into an aqueous solution of carbohydrate and subjecting the mixture to the action of hydrogen under pressure at an elevated temperature.

The process of this invention may be broadly described as a method for the preparation of polyhydric alcohols from carbohydrate which comprises adding a small amount of a catalyst of this invention to an aqueous solution or suspension of the carbohydrate and treating the resulting mixture with hydrogen under a pressure of about 25 to about 200 atmospheres and a temperature between about 120° C. and about 210° C. until the hydrolysis and hydrogenation reaction has been effected to the desired extent. During the reaction, any polysaccharide is hydrolyzed to its basic monosaccharide whose aldehyde or ketone groups are then hydrogenated to hydroxyl groups to produce the desired polyhydric alcohol of the monosaccharide. Those polysaccharides having free aldehyde or ketone groups in their molecular structure before they are subjected to the process of this invention may have these groups hydrogenated at the same time as the molecule is hydrolyzed. At any rate, both hydrolysis and hydrogenation reactions appear to be taking place simultaneously when polysaccharides are subject to the process of the invention, and the reaction results in the desired polyhydric alcohols of the basic structural monosaccharides. Polysaccharides composed of different monosaccharides are hydrolyzed and hydrogenated to the polyhydric alcohol of the respective monosaccharides. Monosaccharides containing an aldehyde group are hydrogenated also exclusively by the process of this invention to a polyhydric alcohol containing the same number of carbon atoms, the same space configuration of units attached to the carbon atoms, and with a hydroxyl group attached to the aldehyde carbon atom in place of the oxygen atom. Glucose, for example, is hydrogenated almost exclusively to sorbitol. Monosaccharides containing a keto group in the molecule are hydrogenated to a mixture of approximately equal amounts of two different polyhydric alcohols due to the symmetric nature of the keto carbon atom. Both resulting polyhydric alcohols contain the same number of carbon atoms as the monosaccharide with the same space configuration of units attached to the carbon atoms, but one of the polyhydric alcohols has a hydroxyl group on one side of the keto carbon atom in place of the oxygen atom, and the other polyhydric alcohol has the hydroxyl group on the opposite side of the keto carbon atom in place of the oxygen atom. Fructose, for example, has a keto group at the second carbon atom and the molecule is hydrogenated to approximately equal amounts of sorbitol and mannitol.

Illustrative examples of carbohydrates which may be converted to polyhydric alcohols in accordance with the process of this invention include, for example, glucose, fructose, galactose, mannose, altrose, allose, idose, gulose, arabinose, talose, ribose, xylose, sucrose, maltose, lactose, cellobiose, melibiose, invert sugar, starch, and starch decomposition products such as dextrin, glucose syrups, and corn starch hydrolyzates. Mixtures of carbohydrates may also be used in the process of this invention. For example, a mixture of sucrose and starch may be subjected to the simultaneous hydrolysis and hydrogenation process, or a mixture of glucose and dextrin may be used.

The carbohydrate or carbohydrates to be subjected to the process of this invention are dissolved in water at the appropriate concentration for the hydrolysis or hydrogenation reaction. Concentrations of carbohydrates from 20% to about 80% by weight are usually employed for the reaction. Carbohydrate concentrations in the range of 40% to 70% by weight react particularly smoothly in the reaction and such concentrations are, therefore, the more preferred for this invention. It is not entirely necessary for the carbohydrates to form true solutions with the water as suspensions, and colloidal solutions of carbohydrates readily react.

The amount of catalyst to be used in the process of this invention may vary over a wide range and will depend upon the particular catalyst, carbohydrate, temperature, and pressure which are employed in the process. In general, the higher the level of phosphate in the catalyst and the higher the temperature and pressure used, the less catalyst is required. Polysaccharides tend to require a higher level of catalyst than the monosaccharides. Catalyst concentrations from about 0.3% to about 5.0%, preferably from about 0.6% to about 1.5%, by weight of total nickel based on the weight of carbohydrate are suitable.

The pressures and temperatures employed in the process of this invention may vary over wide limits. Because of the higher reaction rate found in the hydrogenation systems of the present invention, the reaction may be carried out at temperatures from about 120° C. to about 210° C. and hydrogen pressures from about 25 atmospheres to about 200 atmospheres. The preferred ranges of pressure and temperature are from about 75 atmospheres to about 150 atmospheres and from about 150° C. to about 200° C. It is to be understood, however, that higher and lower pressures and temperatures than those described above may be used when deemed necessary or desirable.

The time of reaction will depend upon the specific carbohydrate or carbohydrates being acted upon, the specific hydrogenation catalysts used, pressure, temperature, and the concentration of the carbohydrate. Generally, the time may be about 30 to about 150 minutes. However, some reactions may take longer or shorter periods of time; and, in any event, the reaction should be continued until the hydrolysis and hydrogenation has been completed.

The reactants may be added to the reaction chamber in any suitable manner or in any suitable order. It is preferred to add the catalyst to the aqueous solution or suspension of the carbohydrate and then add the hydrogen under pressure and commence heating the mixture to the desired temperature.

The reaction is carried out in any suitable type of apparatus which enables intimate contact of the reactants and control of the operating conditions and which is resistant to higher pressures involved. The process may be carried out in batch, semi-continuous, or continuous operation.

Upon completion of the reaction, the catalyst is removed by filtration or decantation and the polyhydric alcohol may be separated from the filtrate by any suitable means, such as, filtration, washing, crystallization, solvent extraction, and evaporation.

In order that those skilled in the art may better understand how the present invention may be practiced, the following examples are given. These examples are set forth solely for the purpose of illustration and any specific enumeration of details contained therein should not be interpreted as expressing limitations with this invention. All parts and percentages are by weight unless otherwise stated.

EXAMPLE 1

98.15 grams of nickel nitrate·$6H_2O$ and 8.69 grams of iron nitrate·$9H_2O$ are dissolved in about 300 ml. of distilled water. 29.2 grams of 85% phosphoric acid and 72.0 grams of kieselguhr are added to the solution. The resulting slurry is then heated, with stirring, to 85 to 95° C. and 53.6 grams of anhydrous sodium carbonate in 150 ml. of distilled water are added over a one hour period, the pH of this slurry rising to 7.9 during the addition of the sodium carbonate solution. The slurry is maintained at 90° C. for an additional 45 minutes and then filtered and washed with distilled water. The wet catalyst is then dried at 150° C. for 17 hours. The dried green catalyst is ground to pass through a 325 mesh screen and then activated by passing a stream of hydrogen over it at 500° C. for 30 minutes. The catalyst assay, as determined by laboratory analysis, was 2% iron, 6.4% metallic nickel, 26.7% nickel phosphate, the remainder being inert carrier. The green catalyst has a surface area of 194 m.$^2$/g. (BET) and a pore volume of 0.39 ml./g.

EXAMPLE 2

200 grams of nickel nitrate·$6H_2O$ and 17.5 grams of iron nitrate·$9H_2O$ are dissolved in 600 ml. of distilled water. 24.7 grams of an 85% solution of phosphoric acid and 147 grams of activated carbon are then added. The resulting slurry is heated, with stirring, to 85 to 95° C. and 109 grams of anhydrous sodium carbonate in 300 ml. of water added over a one hour period. The slurry is then maintained at 90° C. for an additional 45 minutes, filtered, and washed with distilled water. The catalyst is then dried at 5 inches of mercury absolute pressure for 20 hours at 105° C., ground, and activated by passing a stream of hydrogen over it at 500° C. for 30 minutes. The catalyst contains 10.3% metallic nickel, 1.1% iron, and 18.6% nickel phosphate, the remainder being the carbon carrier.

EXAMPLE 3

19.5 liters of demineralized water, 217 grams metallic iron, and 4340 grams of metallic nickel are added to an agitated vessel fitted with a cooling jacket. While cooling this slurry, 18 kilograms of 70% nitric acid is slowly added. The contents of the vessel are then allowed to slowly heat up to 190 to 200° F. The contents of the vessel are held at this temperature for 3 hours, thereby converting the metals to the corresponding nitrate. To the resulting solution, 15 liters of demineralized water, 12.35 kilograms of kieselguhr and 1.54 kilograms of 85% phosphoric acid are added. The resulting slurry is heated with stirring to 90° C. 7700 grams of anhydrous sodium carbonate dissolved in 31 liters of distilled water are then added over a period of two hours. The resulting slurry is then held for one hour at 90° C., the pH rising to 7.2. The slurry is then filtered hot on a plate and frame filter press, and the filter cake washed with 250 liters of the demineralized water. The filter cake is partially dried by blowing it with hot air and transferred to a vacuum oven where the moisture content is reduced to 1–4% by drying for 16 to 20 hours at 105° C. and about 4 to 7 inches of mercury absolute pressure. The catalyst is then activated by contacting it, in a continuous rotary kiln, with a counter current flow of hydrogen at a temperature of about 500° C. The activated catalyst is then stored in the absence of oxygen until used. Analysis of the activated catalyst is 16.2% metallic nickel, 1.1% iron, and 12.5% nickel phosphate.

EXAMPLE 4

73 grams of metallic iron, 1,410 grams of metallic nickel, and 6.3 liters of demineralized water are placed in a stirred, cooled vessel and 5.86 kilograms of 70% nitric acid are added slowly. After the temperature has been stabilized at 90° C., 20 more liters of demineralized water are added. 3.7 kilograms of kieselguhr, 13.1 kilograms of a dried spent catalyst and 1.54 kilograms of 85% phosphoric acid are added. The slurry is then maintained at 90° C. for 15 to 30 minutes. 10 kilograms of sodium carbonate and 40 kilograms of demineralized water are added over a period of about 2 hours while maintaining the temperature at 90° C. The slurry is then held an additional hour at 90° C. and then filtered hot in a plate and frame filter press. The filter cake is then washed and dried and activated with hydrogen in accordance with the process described in Example 3. The activated catalyst had the following analysis: 16.3% metallic nickel, 1.1% iron, and 12.5% nickel phosphate.

EXAMPLE 5

88 grams of nickel nitrate·$6H_2O$ and 3 grams of 85% phosphoric acid are added to a slurry of 53 grams of kieselguhr in 116 grams of water. The resulting slurry is heated, with stirring, to 85 to 95° C. and 38 grams of anhydrous sodium carbonate in 150 grams of distilled water are added over a one hour period, the pH of the slurry rising to 7.2. The slurry is maintained at 90° C. for an additional 45 minutes and then filtered and washed with distilled water. The wet catalyst is then dried at 150° C. for 17 hours. The dried green catalyst is ground to pass through a 325 mesh screen and then activated by passing a stream of hydrogen over it at 500° C. for one hour. The catalyst assay, as determined by laboratory analysis, was 19.8% metallic nickel and 7.2% nickel phosphate, the remainder being inert carrier.

EXAMPLE 6

200 grams of nickel nitrate·$6H_2O$, 8 grams of copper nitrate·$3H_2O$, and 9 grams of iron nitrate·$9H_2O$ are dissolved in 600 ml. of distilled water. 30 grams of an 85% solution of phosphoric acid and 150 grams of kieselguhr are added. The resulting slurry is heated, with stirring, to 85 to 95° C. and 110 grams of anhydrous sodium carbonate in 300 ml. of water added over a one hour period. The slurry is maintained at 90° C. for an additional 45 minutes and then filtered. The filter cake is washed with distilled water, dried at 5 inches of mercury absolute pressure for 20 hours at 105° C., ground, and activated by passing a stream of hydrogen over it at 500° C. for 30 minutes. The resulting catalyst contains 8.1% metallic nickel, 0.55% iron, 0.78% copper, 21.8% nickel phosphate, and 68.77% kieselguhr.

EXAMPLE 7

11.55 grams of the catalyst of Example 1 are added to 200 grams of a 50% aqueous solution of corn starch hydrolyzate under in an inert nitrogen atmosphere. The corn starch hydrolyzate used is a hydrolysis product of corn starch and contains about 63% dextrose, about 17% disaccharides, about 4% trisaccharides, about 3% tetrasaccharides, and about 12% higher polysacharides. The resulting slurry has a pH of 6.5. The slurry is then added to a stirred stainless steel autoclave and heated in the presence of hydrogen to 160° C., while maintaining the hydrogen pressure at 1500 p.s.i.g. The reaction is continued at this temperature for 30 minutes. The temperature is then increased to 180° C. and the pressure to 2000 p.s.i.g. and the reaction continued for an additional 30 minutes. The reaction product, which has a pH of 3.1, is then cooled and filtered. The filtrate is passed through a bed of an ion exchange resin and concentrated to 70% solids. The analysis of this product on a dry basis was 94.3% sorbitol.

EXAMPLE 8

Example 7 is repeated except that 8.6 grams of catalyst are used. The initial pH of the slurry is 6.4 and after reaction the pH is 3.4. The sorbitol assay (percent of solids) is 96.9%.

EXAMPLE 9

Example 7 is repeated except that 5.8 grams of catalyst are used. The initial pH is 6.3 and the final pH is 4.3. The assay of this product is 95.8% sorbitol.

EXAMPLE 10

200 pounds of a 50% aqueous solution of corn starch hydrolyzate having a dextrose equivalent of 77.5 are slurried with 8.9 pounds of a catalyst consisting of finely divided metallic nickel and finely divided nickel phosphate supported on kieselguhr wherein the total nickel content is 22.5% by weight of catalyst and the $PO_4$ content is 2.0% by weight of catalyst. Successive batches of this slurry are then pumped at a rate of 51 pounds per hour to a system of five autoclaves connected in series. To the second autoclave phosphoric acid is added at a rate of .004 pound per pound of sugar. The pressure on all five autoclaves was maintained at 2000 p.s.i.g. of hydrogen and the slurry agitated by the addition of high pressure hydrogen. The temperature in the first autoclave is maintained at 160° C., 170° C. in the second reactor and 180° C. in each of the remaining three reactors. The product of the fifth reactor is filtered and ion exchanged, and was found to contain 92% sorbitol, based on the weight of total solids.

EXAMPLE 11

1.5 grams of nickel phosphate and 10 grams of a standard nickel catalyst consisting of finely divided metalic nickel and finely divided metallic iron deposited on an inert carrier in amounts such that the weight of nickel is 20.8% and the weight of iron is 1.03% based on the total weight of nickel, iron, and carrier was slurried with 200 grams of a 50% aqueous solution of corn starch hydrolyzate containing 63% dextrose and about 37% polysaccharides. The slurry was charged to an autoclave and heated for 30 minutes at 190° C. and 2000 p.s.i.g. of hydrogen. The reaction product was then filtered, ion exchanged and analyzed. The product contained, based on the weight of solids, 94.3% sorbitol.

Example 9 was repeated except that no nickel phosphate was added. The final product contained 52.0% sorbitol based on the total weight of solids in solution.

EXAMPLE 12

8.42 grams of a reduced catalyst consisting of finely divided metallic nickel and finely divided nickel phosphate supported on a porous carrier wherein the metallic nickel is 14.2% by weight and the nickel phosphate is 13.3% by weight, are slurried with 250 g. of 60% aqueous solution of sucrose under a nitrogen atmosphere. The resulting slurry has a pH of 6.3. The slurry is hydrogenated as described in Example 7 at 140° C. for 0.5 hour and at 160° C. for 0.5 hour, while maintaining the hydrogen pressure at 2000 p.s.i.g. The reaction product, which has a pH of 4.9 is cooled and filtered. The filtrate, after ion-exchange and concentration to 70% solids, analyzed on a dry basis 74.5% sorbitol and 24.3% mannitol.

EXAMPLE 13

612 grams of a 50% aqueous solution of glucose is slurried with 14.2 grams of a catalyst containing finely divided metallic nickel and finely divided nickel phosphate supported on kieselguhr wherein the metallic nickel content is 10.6% by weight and the nickel phosphate content is 22.4% by weight. The slurry is charged to an autoclave and heated for one hour in the presence of hydrogen at 140° C., while maintaining the hydrogen pressure at 1700–1900 p.s.i.g. The slurry is then heated at 160° C. for one hour at 1800 p.s.i.g. of hydrogen. The reaction product is then cooled, filtered, ion-exchanged, and concentrated to 70% solids in solution. Based on the weight of solids in solution, the product contained 98.9% sorbitol.

EXAMPLE 14

Example 13 was repeated except that 13.9 grams of a catalyst containing 14.6% by weight metallic nickel and 15.3% by weight nickel phosphate. The product contained 98.5% sorbitol based on the weight of solids in solution.

EXAMPLE 15

700 grams of a 50% aqueous solution of invert sugar is slurried with 8.1 grams of a catalyst containing finely divided metallic nickel and finely divided nickel phosphate supported on kieselguhr wherein the metallic nickel content is 13.7% by weight and the nickel phosphate content is 16.5% by weight. The slurry is pumped to an autoclave and heated for one hour at 160° C. in the presence of hydrogen at 1700 to 1850 p.s.i.g. The reaction product was filtered, ion-exchanged, and analyzed. The product contained, based on the weight of solids in solution, 74.3% sorbitol and 24.0% mannitol.

Although this invention has been described with reference to specific carbohydrates and catalysts and to specific reaction conditions, it will be appreciated that numerous other carbohydrates and catalysts may be substituted for those described and that the particular reaction conditions employed may be modified, all within the spirit and scope of this invention as defined in the appended claims.

What is claimed is:

1. A catalyst which comprises finely divided metallic nickel and finely divided nickel phosphate supported on an inert carrier wherein the total nickel content is from 12 to 45% by weight, based on the total weight of catalyst, the phosphate ($PO_4$) content is from 0.6 to 23% by weight, based on the total weight of catalyst, and the ratio of toal nickel to phosphorus is greater than 2.84.

2. A catalyst of claim 1 which contains iron in an amount up to 2.5% by weight of catalyst.

3. A catalyst of claim 2 wherein the weight percent of total nickel is from 15% to 30%, the weight percent of phosphate is from 1% to 14%, the weight percent of iron is from 0.1% to 2%, and the ratio of total nickel to phosphorus is greater than 3.28.

4. A catalyst of claim 3 which contains up to 2% by weight of a promoter selected from the group consisting of chromium, cerium, and copper.

5. A catalyst of claim 3 wherein the inert carrier is selected from the group consisting of diatomaceous earth and activated carbon.

References Cited
UNITED STATES PATENTS

| | | |
|---|---|---|
| 1,963,999 | 6/1934 | Larchar. |
| 2,650,941 | 9/1953 | Koome et al. |
| 3,144,415 | 8/1964 | Silverman _____ 252—437 |
| 3,297,778 | 1/1967 | Noddings et al. __ 252—437 XR |
| 3,341,609 | 9/1967 | Kasehagen. |

PATRICK P. GARVIN, Primary Examiner

U.S. Cl. X.R.

260—635